Aug. 19, 1969   R. E. McKINNEY   3,462,360
WASTE TREATMENT
Filed March 16, 1966
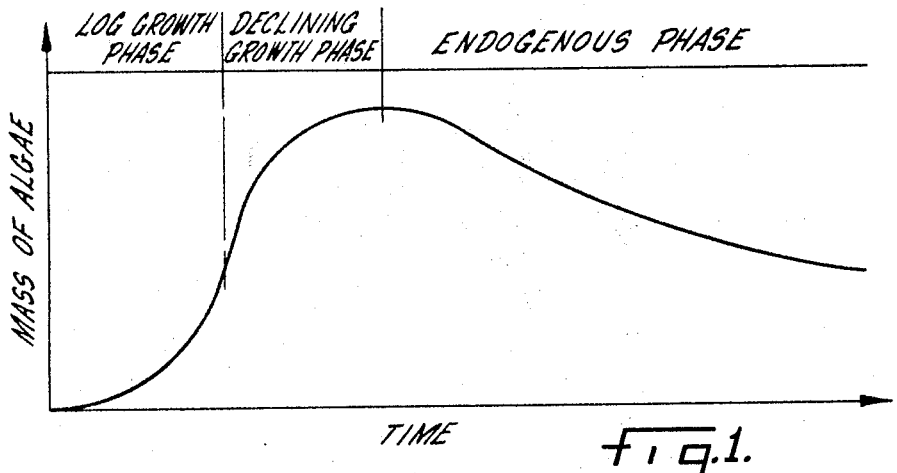
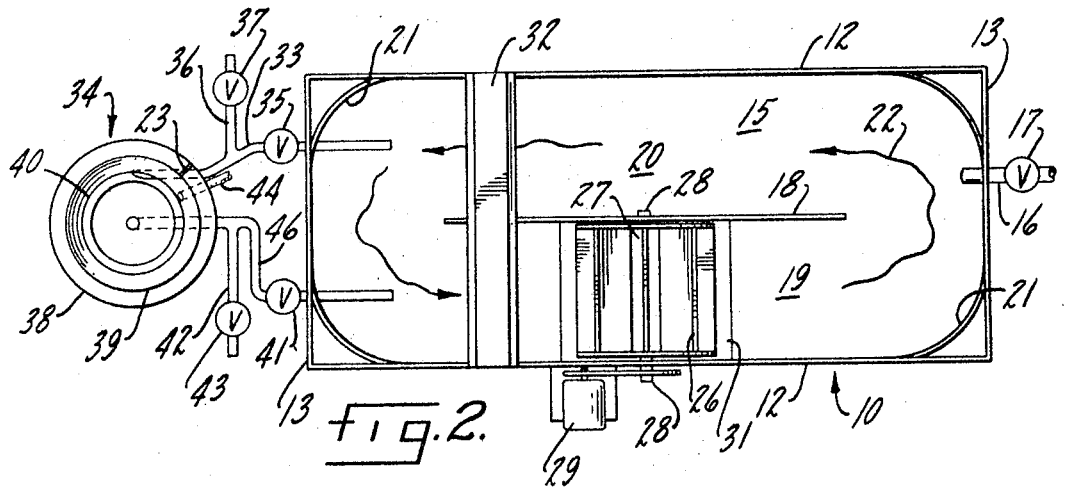
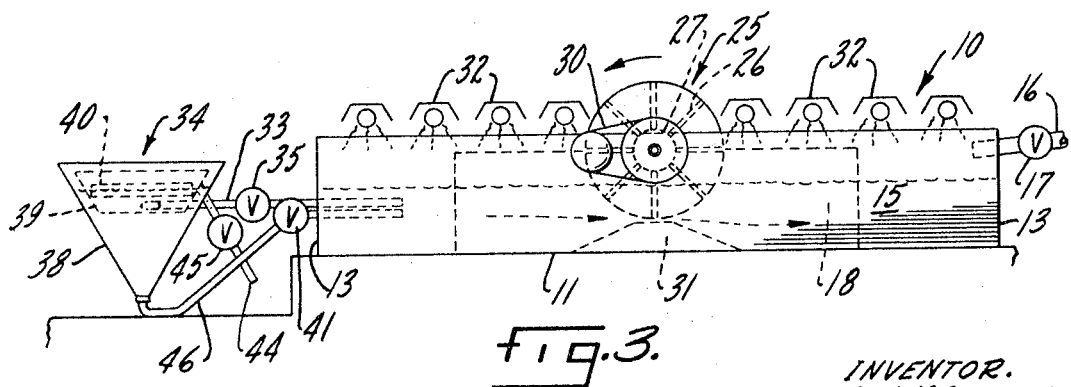
INVENTOR.
Ross E. McKinney,
BY Charles M. Kaplan
ATTORNEY.

United States Patent Office
3,462,360
Patented Aug. 19, 1969

3,462,360
WASTE TREATMENT
Ross E. McKinney, Lawrence, Kans., assignor, by mesne assignments, to Union Tank Car Company, a corporation of Delaware
Filed Mar. 16, 1966, Ser. No. 534,772
Int. Cl. C02c 5/02
U.S. Cl. 210—11                    15 Claims

ABSTRACT OF THE DISCLOSURE

Algae is removable from a liquid by means of biological self-flocculation that occurs when the average solids concentration is above 1000 mg./l. dry weight with at least 50% of such solids being algae and when the quantity of inorganic minerals metabolizable by the algae in such liquid are below the minimum amount needed to cause log growth of the algae in such liquid.

---

This invention relates to the sedimentation of algae as a self-flocculating mass, and more in particular to methods and apparatus for treating waste liquids with such algae. The term algae as used herein is intended to include all microscopic aquatic plants that carry out true photosynthesis.

Natural waters such as rivers and lakes are currently used for the disposal of domestic and industrial wastes. In bygone days this presented few problems because such waters had the capacity by natural processes to absorb and break down the wastes dumped into them. Rapidly expanding population and industrialization have increased the volume of waste that must be disposed of far beyond the amount our natural waters can handle. Municipalities and industry have met this problem in part by employing waste treatment facilities that perform primary treatment (settling solids), and secondary treatment (aerobic and anaerobic digestion). Primary and secondary treatment facilities are generally adequate to oxidize organic matter in the wastes to soluble mineral compounds containing carbon, nitrogen and phosphorus. Such minerals in solution are part of the effluent from these treatment facilities and are discharged into the natural waters, where they are available as soluble inorganic fertilizers stimulating the growth of plants.

The availability of such soluble inorganic fertilizers in natural waters generally corresponds to the growth of population and industry in the same manner as does the growth of waste that must be treated. The result has been pollution from plant growth that can be a nuisance comparable to that caused by the dumping of untreated wastes. For example, excessive growth of algae resulting from such soluble inorganic fertilizers in natural waters causes undesirable color and odor in drinking water, clogs filters in treatment facilities, and decomposes into putrid masses of protoplasm. Thus, unless the soluble inorganic minerals that are a by-product of conventional waste treatment can be removed from the effluent, the treatment of the waste is not complete, and the problem of water pollution resulting from waste disposal still exists.

Removal of these soluble inorganic minerals (tertiary treatment) is rare because the prior art has not developed systems that are economical in the treatment of large volumes of waste. It has been proposed that algae be employed as part of tertiary treatment systems, since the soluble inorganic mineral compounds that are the by-product of primary and secondary treatment are natural foods for algae. Algae use light energy to convert such minerals into algal protoplasm and thus remove them from the water. Thus by maintaining algae in contact with such minerals in an environment providing adequate light for sufficient time, the minerals will be removed from the liquid by formation of algae cells. Such a process occurs in sewage treating lagoons of the type that have been used for many years. However, such lagoons have been almost entirely ineffective as tertiary treatment facilities, and indeed essentially all efforts by the prior art to employ algae in tertiary treatment have failed.

The reason that the use of algae in tertiary treatment has failed in the past is because the algae could not be economically separated from the effluent. Thus, the algae flowed into the natural body of water receiving the effluent. Since the soluble inorganic minerals that should have been removed by the tertiary treatment became a part of the algae protoplasm, these minerals are carried into the receiving body of water where they once again become soluble inorganic fertilizers promoting the growth of plant life after the algae die. My invention solves the problem of the removal of algae from the effluent of a treatment facility by means that are economical for handling large volumes of waste.

Accordingly, it is an object of my invention to improve waste treating processes and apparatus by the use of algae.

Another object is to provide waste treating processes and apparatus in which algae can be sedimentated as a self-flocculating mass.

Another object is to provide waste treating processes and apparatus employing algae in which the algae is removable from the effluent without requiring chemical coagulants or filter screens.

Another object of the invention is to provide tertiary waste treatment processes and apparatus in which algae is the medium used to remove soluble inorganic mineral compounds that would otherwise pollute natural waters by serving as fertilizers promoting plant growth.

Another object is to provide processes and apparatus in which algae is recoverable as a useful by-product.

Another object is to provide waste treatment processes and apparatus in which algae provides oxygen needed by bacteria that break down organic wastes by aerobic digestion.

Another object is to provide waste treatment processes and apparatus in which algae and bacteria are mixed so that each provides chemicals needed by the other, which results in tertiary and secondary treatment being accomplished simultaneously.

Other objects and advantages of my invention will become apparent from the specification, drawing, and claims, and the scope of the invention will be pointed out in the claims.

Briefly stated, according to one aspect of the invention, liquid waste is treated by bringing such waste into contact with algae that is sedimentated by self-flocculation.

In the drawing:

FIG. 1 is a theoretical diagrammatic representation of a growth pattern of algae.

FIG. 2 is a schematic, partially broken-away, plan view of an embodiment of the invention.

FIG. 3 is a side elevational view of the apparatus shown in FIG. 2.

By the practice of my invention, algae used in waste treatment can be sedimentated into a self-flocculating mass that removes itself from the effluent of a treatment facility. This is accomplished by maintaining the following two conditions in the treatment facility:

First, the average concentration of total solids in the facility must be above 1000 milligrams per liter (mg./l.) dry weight, with 50% or more of such solids being algae. Second, the quantity of soluble inorganic minerals consumable by the algae in the system must be less than the minimum amount needed to cause log (i.e., logarithmic) growth of algae at the specific average solids concentration existing in the facility at any given time; the minimum quantity of minerals needed to cause log growth can also be described in terms of the ratio of such minerals to the mass of algae in the facility. These conditions will be explained in detail in paragraphs that follow.

In natural waters where algae exists and in sewage treating lagoons, the average algae concentration is not sufficient to enable the algae to sedimentate as a self-flocculating mass. For example, in sewage lagoons the average algae concentration is estimated to be in the range between 0 and 300 mg./l., with the most common concentration being about 100 mg./l.; these values for solids concentration are on a dry weight basis of insoluble solids with over 50% of the solids being algae. I have discovered that when the other conditions set forth as necessary herein are present in a waste treatment facility, and when the solids are over 1000 mg./l. on a dry weight basis and over 50% of such solids are algae, the algae can be flocculated into a self-sedimentating mass. When the concentration is below 1000 mg./l., the algae remain dispersed and pass out with the effluent, as was the problem with prior art arrangements. An upper limit of about 8000 mg./l. total dry weight of solids has been found to exist. When the solids concentration is above about 8000 mg./l., the algae will not sedimentate to a low enough level to enable a clear effluent to be drawn out of the facility. The dry weight of suspended solids should be determined by the membrane filter technique described on page 1321 of the November, 1956 issue of "Sewage and Industrial Wastes." The presence of over 50% algae in the residue should be determined by direct microscopic examination of the algae-waste mixture; the solid masses observed should comprise at least 50% green algae.

Algae employ soluble inorganic mineral compounds in water to build protoplasm when sufficient light energy is present. The minerals metabolized are carbon, which usually occurs as $CO_2$, $HCO_3-$, or $CO_3=$; nitrogen which occurs as $NH_3$, $NH_4$, $NO_2$ or $NO_3$; and phosphorus which is usually available as $PO_4$. Oxygen is also employed by algae, but it is believed to be obtained by breaking down $H_2O$ molecules. The expression "inorganic minerals metabolizable by algae" as used herein is intended to mean the chemicals set forth above in that such chemicals can be changed by photosynthesis into algae protoplasm. Those skilled in the art will realize that such chemicals may be needed in varying amounts by different species of algae, and that it is also necessary that certain trace elements be available, although their precise function in the algae photosynthesis reaction is not definitely known. Such trace elements include Fe, Mn, Cu, Zn, Mo, V, B, Co, Ca, Na. Some vitamins such as $B_{12}$ also appear to be needed for some species of algae.

In natural waters and in sewage treating lagoons employing algae, there is an overabundance of such inorganic minerals metabolizable by algae. Therefore, the algae population does not grow to the extent where algae cells begin to die because there is insufficient food to support the algae population. This overabundance of inorganic minerals metabolizable by algae is a major cause for the inability of algae to sedimentate into a self-flocculating mass in prior art systems. This condition can be explained by reference to FIG. 1, which is intended as a representation of the growth pattern of algae in a static food medium showing the mass of algae cells over an extended period of time. In the first or log growth phase there is an excess of inorganic minerals metabolizable by algae in the water in which the algae is found. As long as this condition exists, the rate of mass build-up resulting from photosynthesis of inorganic minerals by the algae will be limited only by the algae's ability to photosynthesize the minerals. The system has a maximum amount of energy during the log growth phase, and the individual algae cells are in the most vigorous and healthy condition that will occur, assuming other conditions such as temperature and light availability are favorable. The second or declining growth phase occurs when the concentration of inorganic minerals metabolizable by algae is insufficient to satisfy the population or mass of algae existing in the system. After the mass of algae reaches a certain concentration ratio with respect to the inorganic minerals metabolizable by algae, the rate of growth becomes less and less, and the available energy in the system also declines. This weakens many algae cells and also increases the number of dead or dying cells in the system. The third or endogenous phase occurs when the food concentration is so low that the algae cells metabolize their own protoplasm in order to exist. During the endogenous phase, algae cells release some of the inorganic minerals they have previously metabolized from the waste liquid.

I have discovered that when the quantity of inorganic minerals metabolizable by algae in any given system is high enough to cause the algae to be on the log growth portion of the curve shown in FIG. 1, the algae cells exhibit the general characteristics of colloids in that they are highly dispersed. When this condition occurs, it is impossible to sedimentate the algae by self-flocculation, and I believe the reason is that the individual algae cells have sufficient energy to break away from each other by overcoming the van der Waals forces that tend to hold them together after collisions between such cells. I have further discovered that by controlling the quantity of inorganic minerals metabolizable by the algae in the system in such manner that the quantity is low enough to maintain the algae in the declining growth phase, sedimentation by self-flocculation will occur when the other conditions indicated as necessary herein also exist. I believe the reason sedimentation occurs is that by practicing my invention the mean free path of the algae is decreased such that the number of collisions between individual algae cells is greatly increased, while at the same time the ability of the cells to separate from each other is greatly decreased; this is believed similar to what occurs when bacteria are sedimentated during an activated sludge secondary treatment operation.

The quantity of inorganic minerals metabolizable by algae in a treatment facility is maintained at the necessary concentration by controlling the rate or volume of waste flowed through the facility, or the rate or volume of algae removed from the facility, or any combination of these variables. The waste flow rate through a facility or the waste retention time may be controlling variables because they determine how much time the algae has to metabolize inorganic minerals in the waste. However, sometimes the incoming flow of waste is not controllable, so the treatment facility should be able to handle any load within its design limits. In this case the only factor determining the ratio or relative concentration of algae to inorganic minerals that is controllable is the mass of algae in the facility. Therefore, the ratio between the algae and inorganic minerals metabolizable by algae is maintained so as to prevent log growth of algae by not removing algae from the facility when too much inorganic mineral is entering the facility. If insufficient inorganic mineral is entering the facility and this causes the algae to enter the endogenous phase, it may be necessary to supplement the minerals in the incoming waste by adding algae fertilizers containing nitrogen and phosphorus or by bubbling $CO_2$ into the facility to provide carbon.

I prefer that the initial batch of algae used to seed a facility contain a mixture of the common species indigenous to the area. A mixture containing Chlorella, Euglena, and Scenedesmus would be satisfactory for many temperate climates. However, Pandorina, Volvox, Chlorogonium, and Chlamydomonas would also be found in many facilities operating in accord with my teachings.

To practice my invention the pH of the algae-waste mixture should be between 6 and 10.5. Optimum results usually occur when pH is between 7 and 9. There will often be a gradual rise in the pH of a properly operating treatment facility because OH ions are a by-product of algae photosynthesis. The temperature of the algae-waste mixture must be kept above the freezing point of the liquid. The upper temperature limit will depend on the particular algae species needed to carry out the process; the temperature must never be allowed to rise above the thermal death point for these species. Similarly, the light intensity must be maintained at a sufficient level to enable the particular algae species used in any given facility to carry out their photosynthesis reaction, but should never be allowed to exceed the level at which algae growth is inhibited. Those skilled in the art will realize that while the preceding disclosure sets forth the conditions necessary for operation of my invention, optimum results for any specific waste treatment facility should be obtained by empirical means so as to determine the best operating range for such variables as temperature, pH, light intensity, and solids concentration.

Further understanding of my invention may be obtained by reference to the apparatus shown in FIGS. 2 and 3, which may be used to provide either tertiary waste treatment or both secondary and tertiary waste treatment. The operation of the apparatus will be explained first with reference to only tertiary treatment.

A waste treatment facility includes a tank 10 having a bottom 11, upstanding side walls 12, and end walls 13. Tank 10 receives the discharge liquid waste 15 from a secondary treatment installation through an influent pipe 16; liquid 15 may, for example, be the effluent from an aerobic treatment installation for domestic sewage, and hence will contain all of the inorganic minerals metabolizable by algae in solution. A valve 17 may be used to regulate the volume or rate of flow of liquid entering tank 10. A vertical baffle 18 at the center of tank 10 divides the tank into a pair of liquid flow channels 19 and 20, and curved end baffles 21 in the corners of tank 10 may be used to promote generally circular liquid flow as indicated by arrows 22.

A paddle wheel 25 has a plurality of paddles 26 extending radially from a hub 27 which is journalled for rotation in bearings 28. Wheel 25 is driven by an electric motor 29 acting through any conventional coupling means such as sprocket and chain drive train 30. Rotation of wheel 25 causes the contents of tank 10 to circulate relatively rapidly through channels 19 and 20. A bottom baffle 31 may be provided beneath paddle wheel 25 to cause upward and downward motion of the liquid that results in roiling of the contents of tank 10 to better achieve homogeneous mixing of solids in the liquid waste. Thus, solids carried by the liquid have a generally circular motion when viewed in a horizontal direction and a generally up and down motion when viewed in a vertical direction; algae travelling in this manner can obtain maximum exposure to light for a given tank size. Also, the up and down motion of the algae can cause it to be exposed alternately to light and dark, which also contributes to efficient use of light energy. Thus, tank 10 defines a first zone in which algae and liquid waste are agitated to provide a generally homogeneous liquid-solid mixture. Agitation of the algae-waste mixture causes collisions between algae cells and hence the mean free path of the algae is relatively short.

Fluorescent lamps 32 span tank 10 to provide light energy to the algae when natural sunlight is not available. Such lamps may be controlled by any conventional circuit including a photo-electric cell so that they are shut off when natural light exceeds 200 foot-candles. Thus, means are provided for ensuring that the algae is continuously supplied with sufficient light energy to metabolize minerals in the waste.

Conduit means 33 connects tank 10 to a settling basin 34, which defines a second or quiescent liquid zone. Flow into conduit means 33 is controlled by valve 35, and a branch conduit 36 controlled by a valve 37 may be used to prevent flow from tank 10 from reaching basin 34. Basin 34 includes an outer, inverted conical tank 38, an inner, truncated conical baffle 39, and a cylindrical weir 40. Conduit 33 is connected at a tangent to tank 38 at a vertical location between the ends of baffle 39. This causes a generally circular flow of incoming waste liquid around the inner surface of tank 38 and produces a quiescent zone of essentially no agitation within baffle 39; a transverse baffle 23 also reduces agitation of the liquid. This permits algae and other solids carried into settling basin 34 to sedimentate by self-flocculation. Such solids may be drawn back into tank 10 by hydraulic pressure differences through return conduit means 46 which is controlled by valve 41; or such solid may be withdrawn from the facility through branch conduit 42 which is controlled by valve 43. The effluent passes over weir 40 and out through discharge conduit means 44 which is controlled by valve 45.

Tank 10 may be seeded with algae and brought up to the necessary solids concentration in the following manner. Sufficient waste liquid 15 is flowed into tank 10 to reach the level indicated in FIG. 3, with valves 35 and 41 being closed. The liquid level should be such that light penetrates to almost the bottom of tank 10 when the average solids concentration is at the optimum value for a given facility. A seed batch of algae containing common species is then placed in tank 10. The paddle wheel 25 and fluorescent lights 32 would then be turned on and the algae permitted to metabolize the inorganic minerals in liquid 15. The initial concentration of algae in liquid 15 could be as low as 100 mg./l. After the algae has metabolized most of the inorganic minerals in the first quantity of liquid 15, which might take as long as four days. the paddle wheel 25 is de-energized and the algae permitted to settle out as best it can. Then as much clear liquid as possible would be withdrawn from tank 10 by opening valves 35 and 37. Then a new dose of waste liquid 15 would be flowed into tank 10 to bring the liquid up to the previous level. This batch type treatment operation would be continued until the algae concentration was high enough to enable the algae to sedimentate by self-flocculation. This would occur when the algae concentration is above 1000 mg./l., as explained in preceding paragraphs. Then valves 17, 35, 41 and 45 would be opened to permit continuous flow of liquid through the facility.

The ratio between inorganic minerals metabolizable by algae and the mass algae in the system can be maintained so as to prevent log growth of algae by controlling the flow rate through the facility and the amount of algae withdrawn through conduit 42. When the quantity of inorganic minerals metabolizable by algae is too great and log growth of algae is occurring, valves 17 and 45 could be closed. This would result in the liquid and algae in tank 10 being continually mixed by turning of paddle wheel 25 until the algae has consumed sufficient minerals to reach the declining growth phase; this condition would be apparent when the algae first begins to semidentate by self-flocculation in basin 34. Then valve 45 could be opened and the flow through treatment facility gradually increased by gradually opening valve 17 until the algae in basin 34 no longer sedimentates by self-flocculation; this would indicate that the quantity of inorganic minerals metabolizable by algae then present is so great that is causes log growth, so the rate of flow through the facility must be decreased. Thus a proper initial flow rate through the facility would be determined. As algae cells continue to be metabolized from the inorganic minerals flowing through the system, the mass of algae may build up to a concentration above about 8000 mg./l., which would result in algae being discharged through conduit 44 with the effluent. When this is about to occur, algae can be withdrawn from the facility through conduit 42 by opening valve 43 and disposed of by any suitable manner. The withdrawn algae would be rich in minerals and could be turned into a useful by-product by mixing it with soil as a fertilizer or compost, or after further processing such algae can be turned into food for humans or animals. Therefore, it may be desirable to continually draw off algae as a useful by-product by maintaining the solids concentration at the lowest level at which the facility will operate efficiently. It is also possible to have the production of algae for food or other uses as the only objective of my invention, in which case a synthetic solution of specific mineral concentrations that will optimize algae production would be used in place of liquid waste. Another situation when it may be desirable to withdraw algae would occur if the mineral content in the influent liquid 15 decreased to the extent that the algae in the facility entered the endogenous phase. This would result in death of an excessive number of algae cells and an aerobic conditions might occur in the tank 10 or basin 34. This could be avoided by maintaining the proper balance between the algae mass and the inorganic minerals by withdrawing algae cells through conduit 42. An alternative would be to keep the algae in balance with the mineral supply by adding mineral fertilizers or bubbling $CO_2$ into tank 10.

The facility shown in FIGS. 2 and 3 is described above as carrying out teritary treatment on the effluent from an areobic digestion operation on domestic sewage, since only insoluble minerals are removed. However, the essentially same apparatus and process may be used to carry out aerobic digestion or secondary treatment simultaneously with the tertiary treatment already described. This could be accomplished by feeding raw domestic sewage into tank 10 through conduit means 16, and by operating the apparatus almost exactly as described above with reference to tertiary treatment. The only new significant consideration would be that it might be necessary to use a larger seed batch of algae (e.g., 1000 mg./l.) to prevent anaerobic conditions from occuring when the raw sewage first flows into the facility.

It is noteworthy that aerobic digestion will occur without the necessity of air pumps and diffusers that are required for prior art aerobic treatment facilities. The reason these expensive devices are not needed is that one of the by-products of the algae metabolic reaction is molecular oxygen in a form that is usable by the bacteria that carry out aerobic digestion. Although some degree of aerobic digestion has occurred in some prior art facilities because of the presence of algae which give off oxygen used by bacteria, tertiary treatment could not be carried out simultaneously because too much algae was discharged with the effluent. Thus tertiary treatment can be practiced while the cost of aerobic digestion equipment is being reduced by following my teachings.

Some of the advantages derived from my invention will be apparent from the following examples.

EXAMPLE I

Laboratory scale apparatus similar in construction to that shown in FIGS. 2 and 3 was used. The apparatus employed was a rectangular treatment tank 6" wide and 20" long; a liquid depth of 2" was maintained in the tank and a horizontal baffle spanned the tank 1" from the bottom to promote mixing. A paddle wheel 6" in diameter with six paddles rotating at about 60 r.p.m. was used to circulate the contents of the tank in one direction across the top of the baffle and in the opposite direction under the baffle. A settling basin shaped like an inverted, right triangular prism with its longest side 10" was connected to receive flow from the treatment tank. Effluent flowed from an opening at the top of the settling basin. Settled sediment was withdrawn from the bottom of the settling basin and either returned to the treatment tank or collected for analysis; a small air lift pumping arrangement was used to withdraw the sediment. Light was supplied by one 200 watt incandescent bulb placed about four inches above the liquid surface in the treatment tank.

The influent liquid was raw domestic sewage obtained from the Lawrence, Kans., sewage treatment plant. This waste liquid was flowed through the apparatus at a constant rate that resulted in a retention time of 5 hours. The apparatus was seeded with approximately 0.5 gm. of a mixed algae culture including Chlorella, Scenedesums and Euglena. The apparatus was operated generally as described with reference to FIGS. 2 and 3 at a room temperature of about 70° F. and atmospheric pressure.

Tests were run over about a 30-day period to determine solids in the liquid in the treatment tank and in the effluent from the apparatus, and to determine nitrogen and phosphate reduction. The results are presented in Table I.

TABLE I

| Day | Dry wt. of solids in treatment tank (mg./l.) | Dry wt. of solids in effluent (mg./l.) | Reduction of inorganic nitrogen (percent) | Reduction of phosphate (percent) |
| --- | --- | --- | --- | --- |
| 8 | 2,000 | 15 | 45 | 52 |
| 13 | 1,300 | 60 | 85 | 52 |
| 15 | 1,900 | 35 | 65 | 30 |
| 21 | 3,550 | 20 | 65 | 46 |
| 23 | 1,850 | 40 | 15 | 46 |

The dry weight of suspended solids in the treatment tank and the effluent was determined by the membrane filter technique described on page 1321 of the November, 1956 issue of "Sewage and Industrial Wastes." Nitrogen content was determined by the methods described on pages 296, 302 and 303 of the 11th edition of "Standard Methods for the Examination of Water and Waste Water," American Public Health Association, 1960, and by the micro-Kjeldahl technique. Phosphates were determined by the methods described on page 199 of "Standard Methods," supra, and five day BOD and pH were determined, respectively by the methods described on page 318 and page 277 of "Standard Methods," supra.

During the period when the above tests were run, pH fluctuated between 7 and 8, and five day BOD reductions in the range of about 75–95% were recorded. Sedimentation of the algae by self-flocculation occurred in the settling basin.

EXAMPLE II

The apparatus, test procedure and conditions of this example were the same as those set forth for Example I, except that light was supplied by three 200 watt bulbs, and the tests were conducted over about a 40-day period.

TABLE II

| Day | Dry wt. of solids in treatment tank (mg./l.) | Dry wt. of solids in effluent (mg./l.) | Reduction of inorganic nitrogen (percent) | Reduction of phosphate (percent) |
|---|---|---|---|---|
| 1 | 2,800 | 10 | 75 | 50 |
| 8 | 3,100 | 25 | 65 | 90 |
| 15 | 2,200 | 40 | 60 | |
| 17 | 2,100 | 45 | 50 | |
| 18 | 2,100 | 35 | 50 | |
| 19 | 2,200 | 35 | 65 | |
| 20 | 2,000 | 35 | 90 | |
| 22 | 1,800 | 30 | 85 | 40 |
| 25 | 3,100 | 30 | 85 | |
| 27 | 3,100 | 10 | 80 | |
| 29 | 2,850 | 10 | 85 | 10 |
| 35 | 1,700 | 15 | 95 | |

Sedimentation of the algae by self-flocculation took place in the settling basin.

Although the forms of the invention herein shown and described constitute preferred embodiments, it is not intended herein to illustrate all of the equivalent forms or ramifications thereof; for example, the tank defining the first or agitation zone could have the shape of a shallow annular trough. The words used are words of description rather than of limitation, and various changes may be made without departure from the invention herein disclosed, and it is aimed in the appended claims to cover all such changes as fall within the true spirit and scope of the invention.

What is claimed is:

1. A method of treating liquid waste comprising mixing said waste with algae in the presence of light so that the algae removes soluble inorganic minerals from said waste by photosynthesis, controlling the quantity of inorganic minerals metabolizable by the algae in such manner that said quantity is low enough to maintain the algae in the declining growth phase, and sedimentating the algae into a biologically self-flocculating mass while it is in said declining growth phase.

2. A method of treating liquid waste comprising mixing said waste with algae in the presence of light so that the algae removes soluble inorganic minerals from said waste by photosynthesis, and sedimentating the algae into a self-flocculating mass by:
   (1) maintaining the average solids concentration in the algae-waste mixture above 1000 mg./l. dry weight with at least 50% of such solids being algae; and
   (2) maintaining the quantity of inorganic minerals metabolizable by the algae in said mixture below the minimum amount needed to cause log growth of the algae in said mixture.

3. The invention defined in claim 2 wherein said average solids concentration is below about 8000 mg./l.

4. A method of treating liquid waste comprising mixing said waste with algae in the presence of light so that the algae removes soluble inorganic minerals from said waste by photosynthesis;
   (1) flowing the algae-waste mixture in a generally circular path in a horizontal direction;
   (2) simultaneously causing the algae-waste mixture to move generally up and down in a vertical direction,
      whereby said algae-waste mixture is agitated to a generally homogeneous condition; and thereafter
   (3) sedimentating the algae into a self-flocculating mass.

5. A method of treating liquid waste comprising mixing said waste with alage in the presence of light so that the algae removes soluble inorganic minerals from said waste by photosynthesis, and sedimentating the algae into a self-flocculating mass by:
   (1) maintaining the average solids concentration in the algae-waste mixture above 1000 mg./l. dry weight, with at least 50% of such solids being algae;
   (2) agitating said mixture in a first zone so as to make said mixture generally homogeneous;
   (3) maintaining the quantity of inorganic minerals metabolizable by the algae in said mixture below the minimum amount needed to cause log growth of the algae in said mixture; and
   (4) moving a portion of said generally homogeneous algae-waste mixture to a quiescent second zone.

6. A method of treating liquid waste comprising mixing said waste with algae in the presence of light so that the algae removes soluble inorganic minerals from said waste by photosynthesis, and sedimentating the algae into a self-flocculating mass by:
   (1) confining a quantity of the algae-waste mixture;
   (2) promoting growth of the algae in said confined quantity until the average concentration of solids is above 1000 mg./l. dry weight, with 50% or more of said solids being algae;
   (3) flowing additional waste into said confined quantity or withdrawing algae from said confined quantity so as to maintain the ratio of inorganic minerals metabolizable by algae to the algae in said confined quantity below the minimum amount needed to cause log growth of algae at said average solids concentration.

7. The invention defined in claim 6 wherein algae is withdrawn from said confined quantity only when the concentration of inorganic minerals metabolizable by algae is insufficient to cause log growth of algae at said average solids concentration.

8. A method of removing algae by sedimentation from a mixture of algae with a liquid solution containing inorganic minerals metabolizable by algae, there being sufficient light energy to enable the algae to metabolize such minerals, comprising the steps of:
   (1) maintaining the average solids concentration in said mixture above 1000 mg./l. dry weight, with at least 50% of such solids being algae; and
   (2) maintaining the quantity of said inorganic minerals metabolizable by algae in said mixture below the minimum amount needed to cause log growth of the algae in said mixture,
      whereby, said algae is settleable into a self-flocculating mass.

9. The invention defined in claim 8 further comprising the steps of:
   (1) agitating said algae and said liquid solution in a first zone so as to make said mixture substantially homogeneous; and
   (2) moving a portion of said substantially homogeneous mixture to a quiescent second zone, whereby said algae sedimentates by self-flocculation in said second zone.

10. The invention defined in claim 8 wherein said average solids concentration is below about 8000 mg./l.

11. In apparatus for treating liquid waste by contacting such waste with algae, the improvement for causing sedimentation of algae into a self-flocculating mass comprising:
   (1) means for confining a quantity of said waste;
   (2) means for mixing algae with said confined quantity so as to provide a generally homogeneous algae-waste mixture;
   (3) means providing sufficient light to said mixture to enable the algae to remove soluble inorganic minerals from said waste by photosynthesis;
   (4) means for maintaining the average solids concentration of said confined quantity above 1000 mg./l. dry weight, with at least 50% of such solids being algae; and
   (5) means for maintaining the quantity of inorganic minerals metabolizable by algae in said confined quantity below the minimum amount needed to cause log growth of the algae in said confined quantity.

12. The invention defined in claim 11 wherein said average solids concentration is below about 8000 mg./l.

13. The invention defined in claim 11 further comprising:
  (1) means defining a settling basin wherein said mixture is maintainable in a quiescent state; and
  (2) means for flowing a portion of said mixture to said settling basin, whereby said algae sedimentates in said settling basin by self-flocculation.

14. The invention defined in claim 13 further comprising means for returning to said confining means algae sedimentated in said settling basin.

15. The invention defined in claim 11 wherein said means for confining waste comprises an open-topped tank constructed and arranged so as to cause said algae-waste mixture to flow in a generally circular path in a horizontal direction, and means for causing said algae-waste mixture to move generally up and down in a vertical direction.

References Cited

Walker, P.G., Rotor Aeration of Oxidation Ditches, Water & Sewage Works, June 1962, Vol. 109, pp. 238–241.

Bogan, R. H., Algae Aid In Sewage Nutrient Removals, Water & Sewage Works, Reference Number, 1962, Vol. 109, pp. R–273 to R–278.

Golveke, C. G., et al., Harvesting Etc., Journal WPCF, April 1965, Vol. 37, pp. 471–483, 497 and 498 Relied on.

MICHAEL E. ROGERS, Primary Examiner

U.S. Cl. X.R.

47—1.4, 58; 210—4, 14, 195